United States Patent
Kenney et al.

(10) Patent No.: US 11,057,888 B2
(45) Date of Patent: Jul. 6, 2021

(54) PHYSICAL LAYER SIGNALING IN NEXT GENERATION VEHICLE

(71) Applicant: Intel Corporation, Santa Clara, CA (US)

(72) Inventors: Thomas J. Kenney, Portland, OR (US); Laurent Cariou, Portland, OR (US); Bahareh Sadeghi, Portland, OR (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/565,789

(22) Filed: Sep. 10, 2019

(65) Prior Publication Data

US 2020/0008201 A1 Jan. 2, 2020

Related U.S. Application Data

(60) Provisional application No. 62/729,274, filed on Sep. 10, 2018, provisional application No. 62/743,145, filed on Oct. 9, 2018.

(51) Int. Cl.
*H04W 72/04* (2009.01)
*H04B 7/0413* (2017.01)
*H04W 84/18* (2009.01)
*H04W 4/48* (2018.01)

(52) U.S. Cl.
CPC ...... *H04W 72/0453* (2013.01); *H04B 7/0413* (2013.01); *H04W 4/48* (2018.02); *H04W 72/0446* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2015/0139206 A1* | 5/2015 | Azizi | H04L 27/3405 370/338 |
| 2016/0014725 A1* | 1/2016 | Yu | H04W 72/0453 370/329 |
| 2016/0156438 A1* | 6/2016 | Sun | H04W 72/044 370/330 |
| 2020/0015111 A1* | 1/2020 | Martinez | H04L 1/1887 |
| 2020/0288393 A1* | 9/2020 | Zhang | H04W 52/16 |
| 2021/0050962 A1* | 2/2021 | Yu | H04L 5/00 |

* cited by examiner

*Primary Examiner* — Saumit Shah
(74) *Attorney, Agent, or Firm* — Eversheds Sutherland (US) LLP

(57) ABSTRACT

This disclosure describes systems, methods, and devices related to physical layer (PHY) signaling in next generation vehicle (NGV). A device may establish a communication session with one or more NGV devices. The device may determine an NGV frame comprising a legacy signal field (L-SIG) and an NGV signal field. The device may determine a plurality of data subcarriers and a plurality of pilot subcarriers associated with the L-SIG, wherein the plurality of data subcarriers and the plurality of pilot subcarriers are surrounded by at least two additional subcarriers. The device may cause to send the NGV frame to the one or more NGV devices.

20 Claims, 10 Drawing Sheets

PHYSICAL LAYER SIGNALING IN NEXT GENERATION VEHICLE

CROSS-REFERENCE TO RELATED APPLICATION(S)

This application claims the benefit of U.S. Provisional Application No. 62/729,274, filed Sep. 10, 2018, and U.S. Provisional Application No. 62/743,145, filed Oct. 9, 2018, both disclosures of which are incorporated herein by reference as if set forth in full.

TECHNICAL FIELD

This disclosure generally relates to systems and methods for wireless communications and, more particularly, to physical layer (PHY) signaling in next generation vehicle (NGV).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
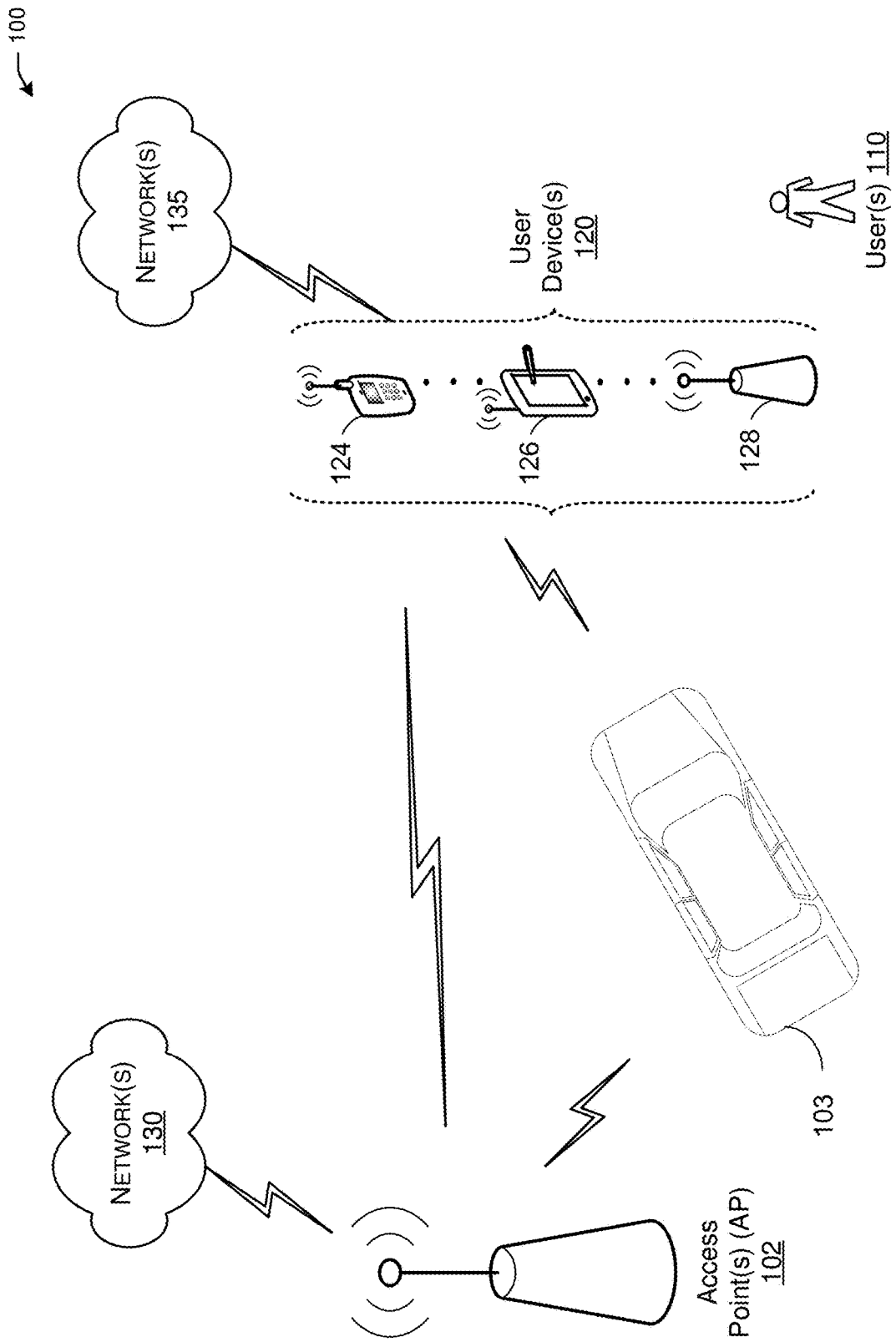
FIG. 1 is a network diagram illustrating an example network environment for physical layer (PHY) signaling in next generation vehicle (NGV), in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A new 802.11ngv (".11ngv or 11ngv) air interface may be defined that is understood by legacy 802.11p (".11p" or "11p") STAs (forward-compatible) but still provides improvements especially with regards to range: legacy compatible 11ngv PPDU format (also referred to as next generation vehicle (NGV) Control PHY), and to define another 802.11ngv air interface that is not understood by legacy 11p STAs: legacy non-compatible 11ngv PPDU format (also referred to as NGV Enhanced PHY).

The dedicated short-range communication (DSRC) band of 5.9 GHz (5.85-5.925 GHz) is reserved for vehicular communications, that is, V2X (V2I/V2N/V2V/V2P) communications. The 802.11p standard is defined as the air interface and Wireless Access in Vehicular Environments (WAVE) protocols have been specified on top of 802.11p to enable different vehicular services. In order to enhance these V2X services, as well as to be competitive with cellular based V2X solutions, IEEE 802.11 started a group to improve 802.11p air interface to provide higher throughput (using e.g., MIMO, higher MCSs), better reliability (using e.g., low-density parity-check (LDPC)) and longer range and robustness to high mobility (using e.g., extended range (DCM), space-time block coding (STBC), midambles, traveling pilots), among other potential enhancements. This group has named the Wi-Fi evolution as next generation vehicular (NGV).

With the introduction of a new air interface to the dedicated short-range communication (DSRC) band there now becomes a need for legacy operation, namely 802.11p (referred to herein as ".11p") devices, to be protected. It is imperative that they are protected since the .11p devices are providing basic safety messages (BSMs), vehicular road side unit (VRU) safety, high-priority messages or management data. Thus, introducing new technology there is a need to guarantee that the .11p devices are able to provide the same services currently afforded with no degradation. This is especially true in cases where the NGV devices wish to use larger bandwidths and those bands are occupied by .11p devices. Thus, there needs to be a way in which the new NGV devices become aware of .11p devices, in addition to informing other NGV devices that .11p devices are near and to provide protection for those devices. Additionally, the NGV devices would fall back to .11p transmissions, or the backward compatible mode NGV PHY which requires to be fully decodable by legacy .11p devices, and thus propagating the existence of .11p to other NGV devices nearby is difficult.

Historically Wi-Fi evolution has taken into account legacy systems during the development. In each evolution step, methods to detect the newer system from that of the legacy has been the focus. Protection of the .11p devices could now mean avoiding channels they are operating on, at least using NGV protocol. Additionally, with Wi-Fi there is typically a fixed AP, or a group of AP's that are more or less managed. In the .11p (or NGV) use cases (V2V, V2I, etc.), device connections are occurring in a dynamic manner due to mobility without association to an AP.

Additionally, having a way of signaling to .11p packets for NGV would be very useful. This signaling would not be understood by legacy .11p devices, but NGV devices would detect and decode while sending .11p packets that legacy devices could also detect and defer appropriately.

There are no known solutions that address this use case with Wi-Fi since .11p is the legacy system and just being deployed. Furthermore, no other Wi-Fi technology is used in this band.

New cars that implement the new 11ngv technology to benefit from higher throughput, better range, etc., will need to communicate with legacy STAs already deployed using 11p, and with new 11ngv STAs using 11ngv. Unlike in mainstream Wi-Fi standards, 802.11p/.11ngv do not operate under the basic service set (BSS) architecture. Thus, messages exchanged between and AP and Non-AP STA do not happen. As example, a capabilities element is not currently exchanged between the two devices. It will be important for 11ngv devices to be able to communicate their capabilities to other STAs. This can be as basic as just the NGV capability, but it could be much more detailed (PHY and MAC capabilities and operation element) in order to enable operation with the best NGV mode.

Such capability can be provided as part of higher layer protocols (above the MAC), but it is likely going to be important to have this be also defined at the MAC layer, especially if some parameters are important in real time. One possible real time requirement would be a change of operation from a transmission for instance regarding the channel bonding feature (different bandwidth, different primary channels, . . . ). Other possible parameters could be Modulation types supported (max), number of streams and transmit beamforming (TxBF) to name a few.

A possible solution is to transmit capabilities in the higher layers. This prevents any real-time modifications of the parameters.

Example embodiments of the present disclosure relate to systems, methods, and devices for propagating and signaling the existence and use of 802.11p devices within 802.11ngv use area using physical layer (PHY) signaling.

In one embodiment, a PHY signaling in NGV system may facilitate NGV devices to use only 802.11p (".11p") transmissions when required, and use a new signaling technique to notify other NGV devices to use only .11p transmissions when appropriate. This signaling may be done while using the legacy .11p packet structure so that the NGV devices can still use the channel, and either communicate with the .11p device or another NGV device, such that the .11p devices would be able to detect and decode the packets. To accomplish this, extra signaling bits, associated with the additional reference subcarriers, will be placed at the band edges of the L-SIG (or other fields, e.g., L-LTF), with new training bits in the L-LTF. As a note, the approach is such that either of these concepts could be used indecently or jointly. Note that using band edges is unique where the extra bits are part of the L-SIG, not the HE-SIGA. This requires new elements to decode the bits. As an addition to the L-SIG getting extra tones, the entire PPDU could also have extra tones during .11p backward compatible transmissions providing even more data. These additional reference subcarriers may be modulated with a known reference sequence. The signaling bits will be used by the NGV device to signal to other NGV devices the existence of .11p legacy devices in the area, along with potentially a few other bits of information. This will be utilized upon detection of .11p devices, and potentially decided based on information exchanged with the .11p device or upon reception from those devices. Additionally, the new PHY signaling bits could also be used for NGV devices to signal other critical parameters to other NGV devices when NGV devices are using legacy .11p transmissions.

Example embodiments of the present disclosure relate to systems, methods, and devices for NGV capabilities and post-signaling.

In one embodiment, a NGV capabilities and post-signaling system may define a new NGV capability element and a new NGV operation element or an element that combines both. (Note that, if carried in the PHY signaling, these are no longer called elements, but subfields in a PHY signaling field). This element may contain:

Subfields for PHY and MAC capabilities. For instance: MIMO capabilities, bandwidth capabilities, TxBF, non-contiguous operation capabilities, A-MPDU capabilities, fragmentation capabilities, etc.

Subfields for operating modes. For instance, Bandwidth, primary channel, periodicity of transmissions and target times for transmissions, MCSs, transmit power, sensitivity, etc.

Subfields for more protection. For example, CRC fields can be added to protect the subfields in the post-signaling or to increase the protection of fields or data in the PPDU (protection of SIG field or of data payload).

In one or more embodiments, to define a container for this capability element, two different categories of solutions may be introduced here.

In one or more embodiments, capabilities included in frames that cannot be understood by legacy 11p devices:

(1) In such cases, a simple solution is to include these elements in the MAC. This can be included in the MAC header with the A-control solution defined in 11ax (using HT-control field) with reusing existing A-control variants such as the OM variant or defining a new one specifically for NGV.

(2) Another simple solution is to define a frame carrying these elements. This frame can then be carried in an MPDU or A-MPDU.

In one or more embodiments, capabilities included in frames may be understood by legacy 11p devices (only the capability part would be ignored by the 11p devices). The HT-control solution may work here, but 11p devices may be confused.

In one or more embodiments, a NGV capabilities and post-signaling system may use bits in the service field if there are not too many capability indication bits.

In one or more embodiments, a NGV capabilities and post-signaling system may define a post-signaling that is included at the end of the PPDU and that only NGV devices would parse. This post-signaling can be a simple SIG field with specific subfields defined as a basic PHY SIG field, or it can be a modulated frame. Based on this information, NGV STAs can optimize the use of NGV features to increase range, reliability, etc.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of PHY signaling in NGV, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
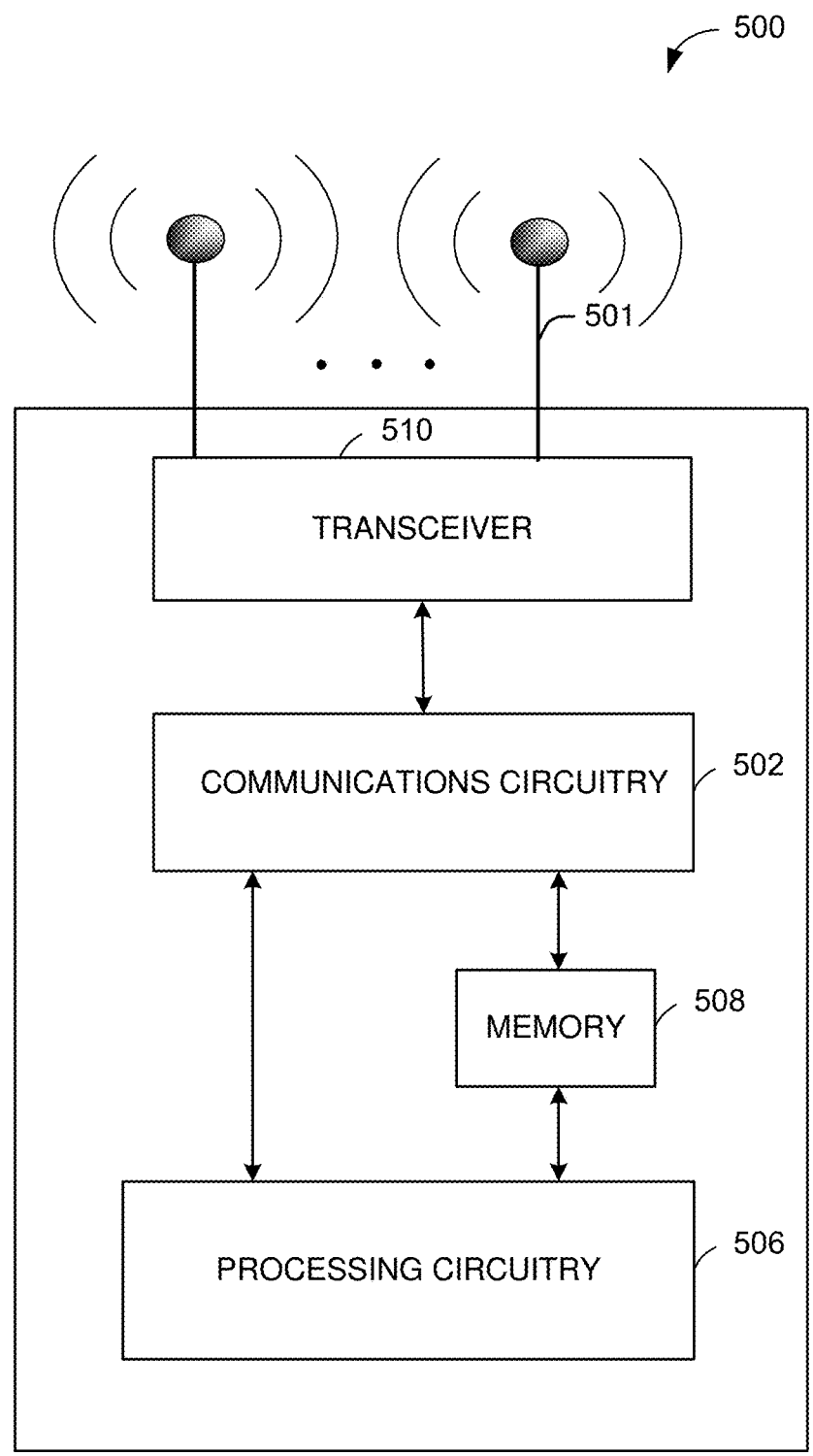
FIG. 5 illustrates a functional diagram of an exemplary communication station that may be suitable for use as a user device, in accordance with one or more example embodiments of the present disclosure.
Figure 6:
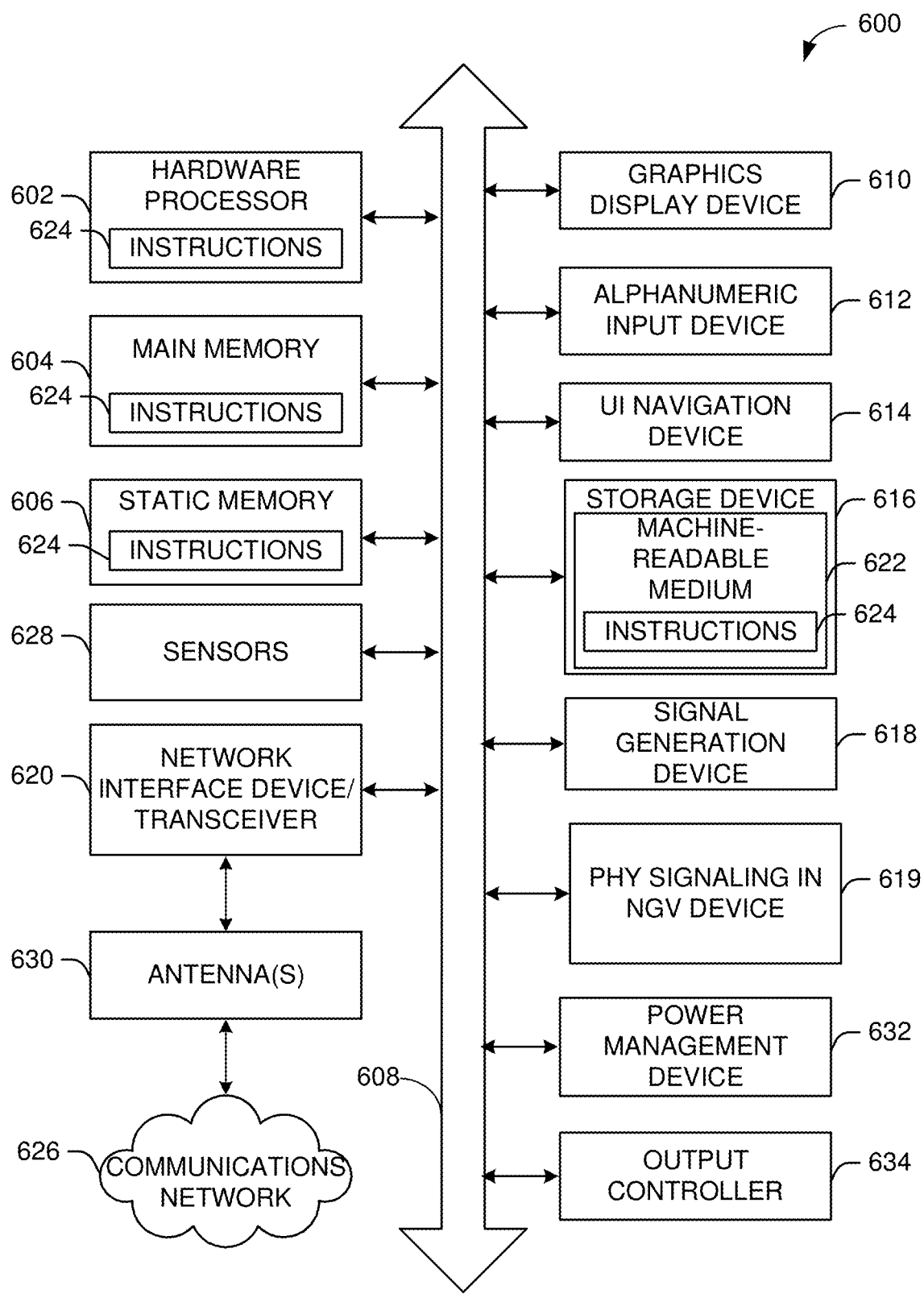
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, one or more APs 102, or more user devices 120 and/or vehicles 103 may communicate with each other through an enhanced 802.11ngv air interface.

Figure 2A:
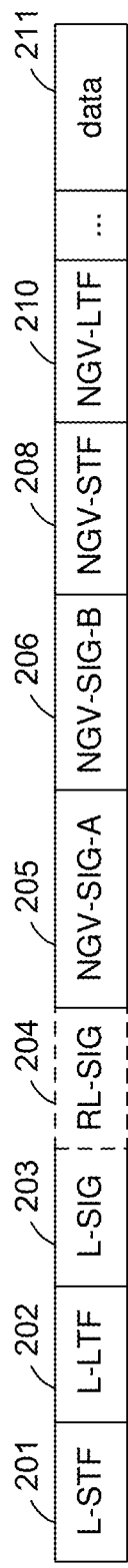
FIGS. 2A-2B depict illustrative schematic diagrams for PHY signaling in NGV, in accordance with one or more example embodiments of the present disclosure.
Figure 2B:
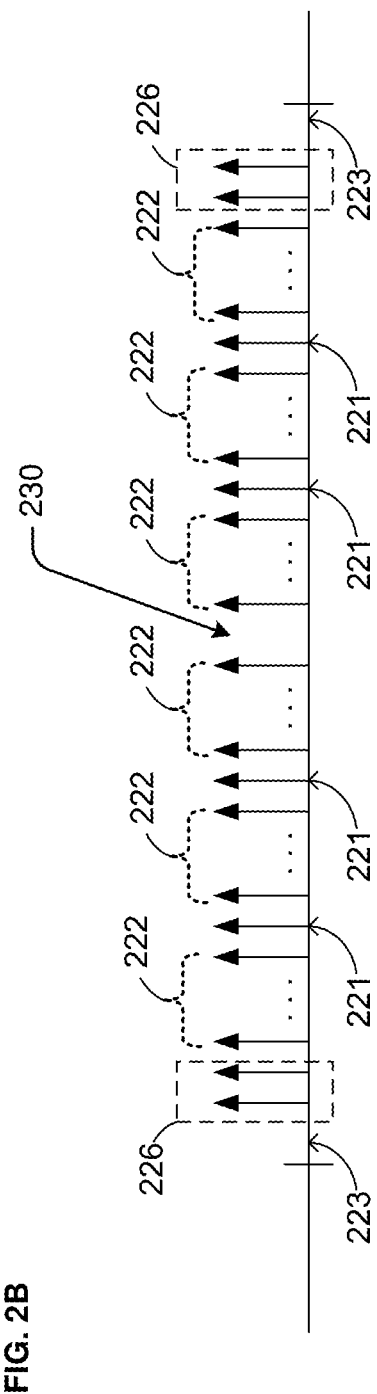

FIGS. 2A-2B depict illustrative schematic diagrams for PHY signaling in NGV, in accordance with one or more example embodiments of the present disclosure.

Referring to FIG. 2A, there is shown an NGV frame 200. The NGV frame 200 may comprise one or more fields that may be transmitted from a transmitting device to a receiving device. The one or more fields may include, at least in part, a L-short training field (STF) 201, a legacy long training field (L-LTF) 202, legacy signal field (L-SIG) 203, an optional repeat L-SIG (RL-SIG) field 204, and NGV-SIG-A field 204, an NGV-SIG-B field 206, NGV-STF field 208, NGV-LTF field 210, and a data field 211. It should be understood that additional fields may be included in the NGV frame 200.

Referring to FIG. 2B, there is shown subcarrier allocations for an NGV frame in accordance with some embodiments. The subcarrier allocations illustrated in FIG. 2B may be used for the L-SIG and one or more field following the L-SIG include the NGV SIG-A and illustrate a total of 56 subcarriers (e.g., located between positions −28 and +28). The subcarrier allocations illustrated in FIG. 2B may include a legacy number of data subcarriers 222, a legacy number of pilot subcarriers 221, and a number of additional tones (e.g., reference subcarriers 226).

In accordance with some embodiments, at least some of the field of the NGV frame 200, for example, the L-SIG field or the L-LTF field may configured for transmission using the legacy number of data subcarriers 222, the legacy number of pilot subcarriers 221, and a number of additional tones (e.g., reference subcarriers 226) modulated with a known reference sequence. At least one symbol of the NGV SIG-A field and the one or more NGV fields following the NGV-SIG-A field of the NGV frame may also be configured for transmission using additional data subcarriers 226. The additional data subcarriers corresponding to the additional reference subcarriers 226 of the L-SIG field. These additional reference subcarriers may be modulated with a known reference sequence.

As illustrated in FIG. 2B, the L-SIG 203 (FIG. 2A) may also include a DC subcarrier 230 and guard tones 223. In these embodiments, the L-SIG 203 may comprise one or more OFDM symbols that may be generated using a 64-point FFT. In some embodiments, an NGV frame 200 may be transmitted over wider bandwidths that may comprise a plurality of 20 MHz channels. In some embodiments, bandwidth may be one of 20 MHz, 40 MHz, 80 MHz or 160 MHz. In some embodiments, a 320 MHz bandwidth may be used.

As outlined above, with the introduction of a new air interface to the dedicated short-range communication (DSRC) band there now becomes a need for legacy operation, namely .11p devices, to be protected. It is imperative that they are protected since the .11p devices are providing BSM safety messages, VRU safety, high-priority messages or management data. Thus, introducing new technology there is a need to guarantee that the .11p devices are able to provide the same services currently afforded with no degradation. This is especially true in cases where the NGV devices wish to use larger bandwidths and those bands are occupied by .11p devices. Thus, there needs to be a way in which the new NGV devices become aware of .11p devices, in addition to informing other NGV devices that .11p devices are near and to provide protection for those devices. Additionally, the NGV devices would fall back to .11p transmissions, and thus propagating the existence of .11p to other NGV devices nearby is difficult. Protection of the .11p devices could now mean avoiding channels they are operating on, at least using NGV protocol. Additionally, with Wi-Fi there is typically a fixed AP, or a group of AP' s that are more or less managed. In the .11p (or NGV) use cases (V2V, V2I, etc.), device connections are occurring in a dynamic manner due to mobility without association to an AP.

There are a few elements of the design. The first being the detection of .11p devices by NGV devices. From there the NGV device then either negotiates with the .11p devices to have the .11p device allow permission to use the channel for NGV, or discontinue using NGV transmissions and use only .11p transmissions or the NGV backward compatible mode. The permission is general in nature in the sense that it would then allow the NGV device to operate in NGV mode when appropriate, or to send backward compatible mode (which .11p devices can decode), packets. Further, the NGV devices will then signal other NGV devices (using PHY signaling) the presence of .11p devices in the area. This will signal to those devices that .11p transmissions should be used on this channel, either at this time or in this area. This will help ensure that legacy .11p devices do not see a degradation of performance, due to other transmissions occurring on the channel that the .11p devices cannot detect/decode.

In one more embodiments, a PHY signaling in NGV system may facilitate detection of legacy .11p devices and Negotiation. In one or more embodiments, for this aspect of the design, basically the requirement would be that NGV devices should continually attempt to detect/decode all .11p transmissions on any channel they expect to utilize. Upon detection, the design has two branches, the first is to negotiate use of the channel for NGV operation with the .11p device. Or to just avoid non-backward compatible NGV transmissions on the channel while the .11p device shares the channel. The negotiation could be done using higher layers of service among the .11p and NGV device. The details are beyond the scope of this design. The output would simply be an answer to the NGV device if the channel can be shared using NGV transmissions, or the NGV device needs to drop to legacy.11p/backward compatible NGV PHY transmissions. If negotiations are not possible, or not added in the design, then the NGV device would also drop to using legacy .11p/backward compatible NGV PHY transmissions either at this time, or in this region depending on the detection of the .11p device.

In one or more embodiments, a PHY signaling in NGV system may enable signaling to other NGV devices the presence of .11p devices. In one or more embodiments, another aspect of the design adds the ability of the NGV devices to notify other NGV devices that it is communicating with, or that can detect this NGV device, that there are legacy .11p devices in the area. Furthermore, notification can include either an indication that the legacy .11p device is giving permission to the NGV transmissions at this time or in this area, or would prefer that all devices use .11p/backward compatible NGV PHY transmissions. The details of how the use, at this time or in this area, could be based on the type of service being provided. For instance if it is emergency use in the area that is utilized, then the .11p device could force the NGV device to avoid using NGV transmissions. If it is more for information sharing in the area, the .11p devices could suggest, but not mandate. The design has the NGV device, upon detecting and determining the type of use allowed (using the steps in item A and B above), then signal to other NGV devices the existence of the .11p device, and the type of use allowed. The method of signaling could be in the higher layers, but the preferred embodiment uses PHY signaling of the .11p/backward compatible NGV PHY transmission. The details are outlined in C below.

In one or more embodiments, a PHY signaling in NGV system may enable NGV PHY signaling using legacy .11p protocol. In one or more embodiments, in this final aspect, the design provides immediate signaling for NGV devices to communicate with other NGV devices using legacy .11p protocol. The need for the signaling is outlined as above. The need for PHY signaling is that it allows devices to quickly detect the signaling and decode the bits more efficiently than going to either the MAC or to higher layers. For this use case, it is imperative that this be done using the legacy .11p waveform so that other .11p devices can detect the L-SIG correctly. Although legacy devices would obviously not be aware of the additional signaling being used by the NGV devices.

In one or more embodiments, a PHY signaling in NGV system may use some of the guard tones of the .11p 10 MHz waveform for additional signaling. Specifically, the PHY signaling in NGV system may add 4 tones to the existing 48 tones used in .11p transmissions.

In one or more embodiments, a PHY signaling in NGV system may facilitate that the L-LTF will have extra training bits, and the L-SIG will have extra signaling bits. The issue is that the extra bits in the L-SIG cannot be part of the L-SIG encoding, thus they would not have any coding. The idea is they would be detected independently from the L-SIG. As a possible additional embodiment, additional tones (e.g., reference subcarriers 226) could be used during the entire PPDU when backwards compatible .11p transmissions are used. This would provide even more signaling on a "side" channel. Knowing the length of this side channel would be known from the L-SIG Length field, since the 'side' channel would be the same length of the signaled PPDU length in the L-SIG. Thus legacy .11p devices would decode the L-SIG normally and respond to the frame or defer decoding the frame appropriately. They would not be aware of the edge tones, and just decode the L-SIG as usual. NGV devices would detect/decode the extra bits (either just the L-SIG, or as a possible extension over the entire PPDU) and be aware of other NGV signaling being used for NGV devices.

In some embodiments, the known reference sequence that is modulated on the additional reference subcarriers 226 of the L-SIG 203 may be used for channel estimation by a receiving NGV device 103 (FIG. 1) to allow the receiving NGV device 103 to demodulate and decode any additional data subcarriers of the NGV-SIG-A 205. In these embodiments, the NGV frame 200 may also be configured to include a legacy short training field (L-STF) 201 and a legacy long-training field (L-LTF) 202 preceding the L-SIG 203. The L-STF 201 and the L-LTF 202 may be conventional legacy training fields.

In some embodiments, the pilot subcarriers 221 and the additional reference subcarriers 226 of the L-SIG 203 carry information that is already known to the receiver (e.g., a known reference sequence). In some embodiments, the pilot subcarriers 221 and the additional reference subcarriers 226 of the L-SIG 203 may have the same modulation (e.g., BPSK+1 or BPSK−1, etc.), while in other embodiments, the pilot subcarriers 221 and the additional reference subcarriers 226 of the L-SIG 408 203 have a different modulation (e.g., pilot subcarriers 221 may have BPSK+1 while the additional reference subcarriers 226 may have BPSK−1).

To address the issue that the extra signaling is not encoded presents the ability to offer two different approaches. The first is to use repetition coding, which affords the possibility to design different levels of coding through repetition instead of convolutional encoding. Depending on the repetition rate and modulation, this could provide anywhere from 1 to 4 extra bits of signaling. Potential options for repetition coding and modulation include:

2× bit repetition with BPSK, providing 2 bits of information signaling (this would give about the same detection probability as the bits in the L-SIG).

4× bit repetition with BPSK providing 1 bit of information signaling. This could be used if it was deemed that the bit signaled is critical and needs better detection at range than the bits in L-SIG (better detection probability than the L-SIG).

2× bit repetition with QPSK, providing 4 bits of information signaling. This could be useful if it was determined this is less critical information, or only needs to be detected closer in range to the STA than the L-SIG covers. (Would be slightly worse detection probability than the L-SIG bits).

Finally, No repetition with BPSK modulation, providing 4 bits of information. This would be a tradeoff of the other cases. This may be good for signaling only to NGV devices closer to the transmitting NGV device.

In one or more embodiments, these different coding rates could be signaled, or one could be used only. An important factor is that the legacy .11p devices do not need to detect the extra bits. Additionally, neither do all the NGV devices, so if there is a reason to only signal to closer-in NGV devices then more options are available.

The second encoding of the signaling data is to use differential encoding. For this the extra tones in the L-LTF would be combined with the matching L-SIG tone. The data would be differentially encoded. To afford different detection performance, this differential encoding can be combined with repetition coding. The idea is that the receiver would use the soft differential decision data and combine with another tone that is identically encoded. This again provides more coding/modulation rate choices. The resulting combinations, similar to the ones listed above (the idea is not limited to just these, but these are the preferred set).

Differential of 1 tone (LTF and L-SIG difference), with 2× bit repetition (thus using 2 sets of Differential tone sets of the LTF and L-SIG difference) using binary phase shift keying (BPSK), providing 2 bits of information signaling (this would give about the same detection probability as the bits in the L-SIG).

Differential of 1 tone (LTF and L-SIG difference), with 4× bit repetition (thus using 4 sets of Differential tone sets of the LTF and L-SIG difference), with BPSK providing 1 bit of information signaling. This could be used if it was deemed that the bit signaled is critical and needs better detection at range than the bits in L-SIG (better detection probability than the L-SIG).

Differential of 1 tone (LTF and L-SIG difference), with 2× bit repetition (thus using 2 sets of Differential tone sets of the LTF and L-SIG difference), using QPSK, providing 4 bits of information signaling. This could be useful if it was determined this is less critical information, or only needs to be detected closer in range to the STA than the L-SIG covers. (Would be slightly worse detection probability than the L-SIG bits).

Finally, differential of 1 tone (LTF and L-SIG difference), with no repetition using BPSK modulation, providing 4 bits of information. This would be a tradeoff of the other cases. (Worse detection than the L-SIG). Good for signaling only to NGV devices closer to the transmitting NGV device.

The above is the approach for just encoding the L-SIG. If more signaling is desired using the entire PPDU if a backwards compatible .11p packet, then the differential encoding would continue through the entire packet. It is understood that the above descriptions are for purposes of illustration and are not meant to be limiting.

Figure 3A:
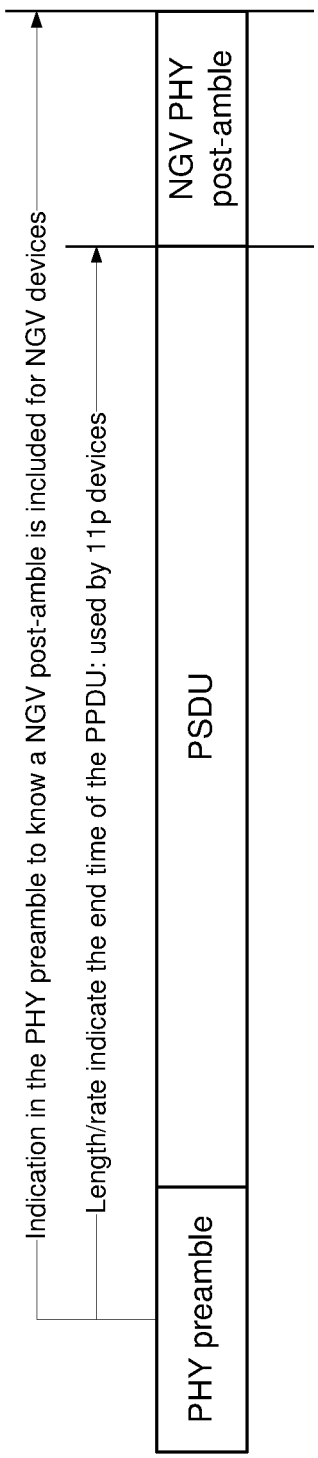
FIGS. 3A-3B depict illustrative schematic diagrams for NGV capabilities and post-signaling, in accordance with one or more example embodiments of the present disclosure.
Figure 3B:
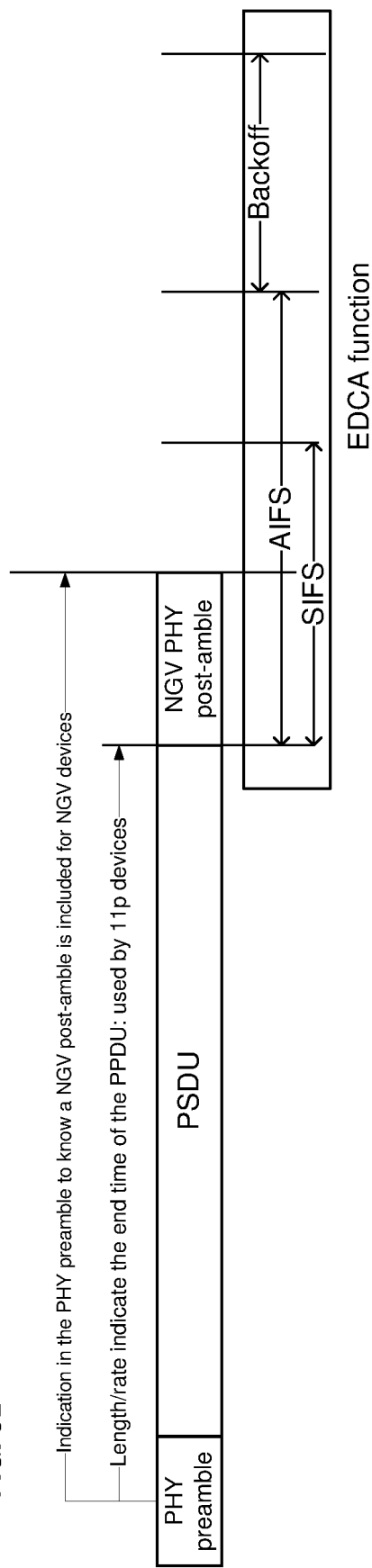

FIGS. 3A-3B depict illustrative schematic diagrams for NGV capabilities and post-signaling, in accordance with one or more example embodiments of the present disclosure.

In one or more embodiments, a NGV capabilities and post-signaling system may facilitate that.

In one or more embodiments, a NGV capabilities and post-signaling system may facilitate that A NGV post-PPDU-Signaling is included at the end of the PPDU (shown in FIG. 3A).

In one or more embodiments, a NGV capabilities and post-signaling system may facilitate that in its simplest form, this NGV post-amble is a simple SIG field (as the SIG field in the PHY preamble), which is designed to carry all the capabilities and operation fields that needed for NGV. This NGV-post-SIG field contains fields that are defined in the specification and a CRC to check the validity of the fields. The modulation and coding rates are fixed and known. Ideally, this would be no more than one or 2 OFDM symbols (but the approach is not limited to this numbers and more could be utilized).

In one or more embodiments, a NGV capabilities and post-signaling system may facilitate a design that could be more elaborate with the variable duration, variable content, etc.

In one or more embodiments, a NGV capabilities and post-signaling system may facilitate that an interesting design would be that the first part of the field contains a signature subfield which is independently encoded and CRC protected, that indicates which content the container will carry. There could be multiple signatures, for different content. Based on the signature, the STA will know the length of the fields that follow and their content. For instance, there could be a type/signature for capabilities, one for specific feedbacks, one for operation element changes, etc. The example is the design of the A-control in the HT control field as defined in 802.11ax.

In one or more embodiments, a NGV capabilities and post-signaling system may facilitate that This NGV-post-SIG field presence is signaled by an indication in the PHY preamble.

It may be considered that this presence is not signaled and that receivers are able to detect the presence of the NGV-post-SIG field on their own.

Referring to FIG. 3A, there is shown NGV Post-PPDU-Signaling symbol(s).

In one or more embodiments, a NGV capabilities and post-signaling system may include this post-signaling in broadcasted messages using 11p format, or in unicasted messages. This way, legacy 11p will detect the content of the PPDU, but not the post-signaling.

There are no issues with the EDCA contention for legacy devices as after the end of the PSDU as shown in FIG. 3A, since they will start a contention period (AIFS+backoff counter decrement). The AIFS is a period made of a SIFS+a specific duration, which needs to be idle. But during the initial SIFS, the specification specifically mentions that the channel can be busy without forcing the device to stop backoff decrement. In the presence of post-signaling (if that duration does not exceed the SIFS duration after the PPDU), legacy devices will wait for SIFS (channel is busy because of the post-signaling but this is ignored by the legacy devices), and then check CCA for the remainder of the AIFS value. As long as the post-signaling does not exceed the SIFS duration, there should be no impact on legacy devices.

11ngv receiving devices however, will determine the end of packet as being after the post-signaling and not before this symbol(s). In such case, they will start their backoff decrement (starting with SIFS and remainder of AIFS) after the post-signaling, which will decrease their chances to access the medium compared to legacy devices. Therefore, the rule in the specification should be enforced that NGV devices will consider the end-of-packet as being before the start of the post-signaling with regards to the EDCA function (backoff decrement) that immediately follows. Basically, the end of packet would still be determined by the length/rate indicated in the PHY SIG field in the preamble. The concept is shown in FIG. 3B. Referring to FIG. 3B, there is shown EDCA function for legacy and NGV devices under the new design. It is understood that the above descriptions are for purposes of illustration and are not meant to be limiting.

Figure 4:
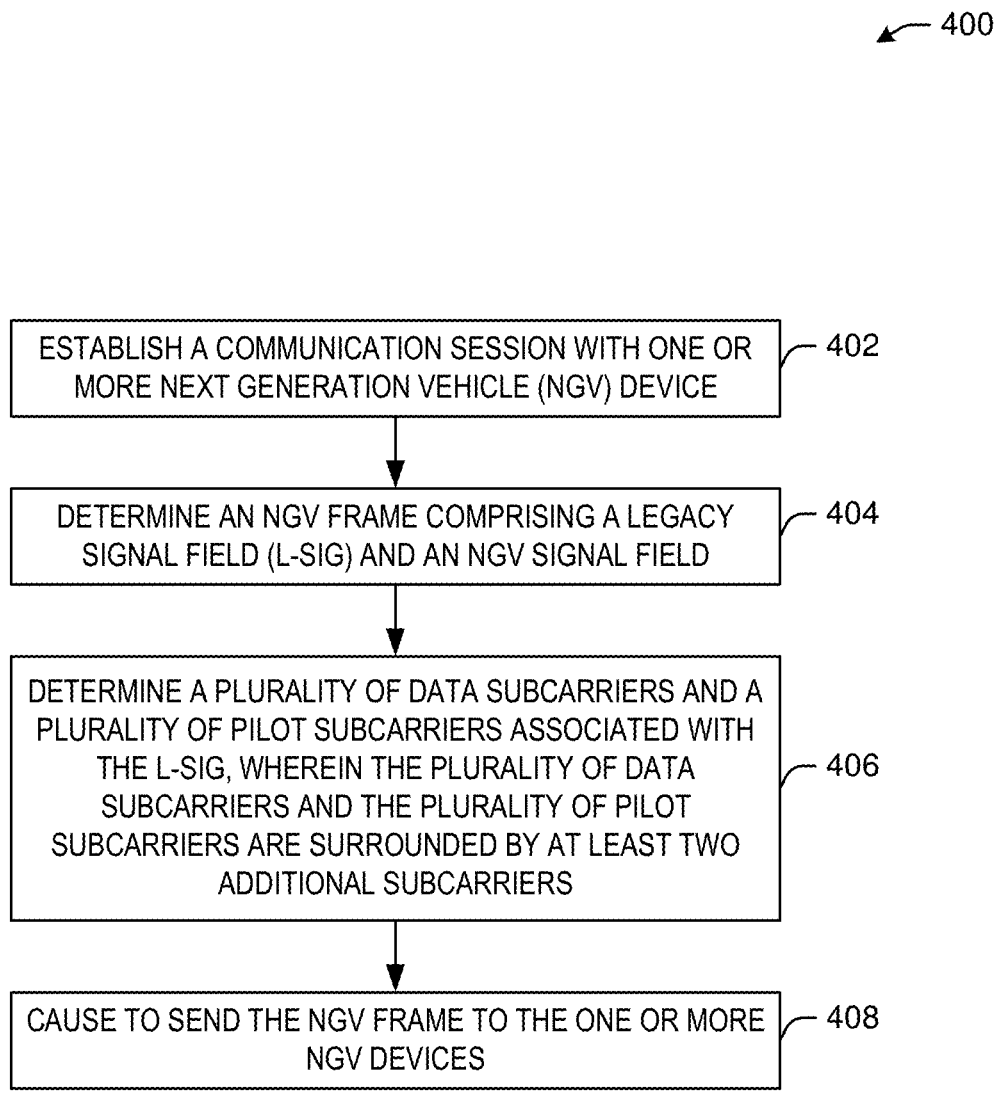
FIG. 4 illustrates a flow diagram of illustrative process for an illustrative PHY signaling in NGV system, in accordance with one or more example embodiments of the present disclosure.

FIG. 4 illustrates a flow diagram of illustrative process 400 for a PHY signaling in NGV system, in accordance with one or more example embodiments of the present disclosure.

At block 402, a device (e.g., the user device(s) 120 and/or the AP 102 of FIG. 1) may establish a communication session with one or more next generation vehicle (NGV) device.

At block 404, the device may determine an NGV frame comprising a legacy signal field (L-SIG) and an NGV signal field.

At block 406, the device may determine a plurality of data subcarriers and a plurality of pilot subcarriers associated with the L-SIG, wherein the plurality of data subcarriers and the plurality of pilot subcarriers are surrounded by at least two additional subcarriers. The at least two additional subcarriers associated with the L-SIG may be located at band edges of the L-SIG. These at least two additional subcarriers associated with the L-SIG may be used as training bits. Also, the at least two additional subcarriers associated with the L-SIG may be used as additional signaling bits. When 802.11p legacy devices receive the NGV frame, these legacy devices may ignore the at least two additional subcarriers of the L-SIG. However, the NGV devices may detect and decode the NGV frame based on the at least two additional subcarriers associated with the L-SIG.

At block 408, the device may cause to send the NGV frame to the one or more NGV device. In addition to other fields, the NGV frame may include multiple training fields, such as a legacy long training field (L-LTF) and a legacy short training field (L-STF). The L-LTF May include at least two additional subcarriers located at band edges of the L-LTF used as training bits. Also, the NGV frame is backward-compatible with 802.11p legacy devices.

It is understood that the above descriptions are for purposes of illustration and are not meant to be limiting.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 102 (FIG. 1) or a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a PHY signaling in NGV device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The PHY signaling in NGV device 619 may carry out or perform any of the operations and processes (e.g., process 400) described and shown above.

It is understood that the above are only a subset of what the PHY signaling in NGV device 619 may be configured to perform and that other functions included throughout this disclosure may also be performed by the PHY signaling in NGV device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium.

Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
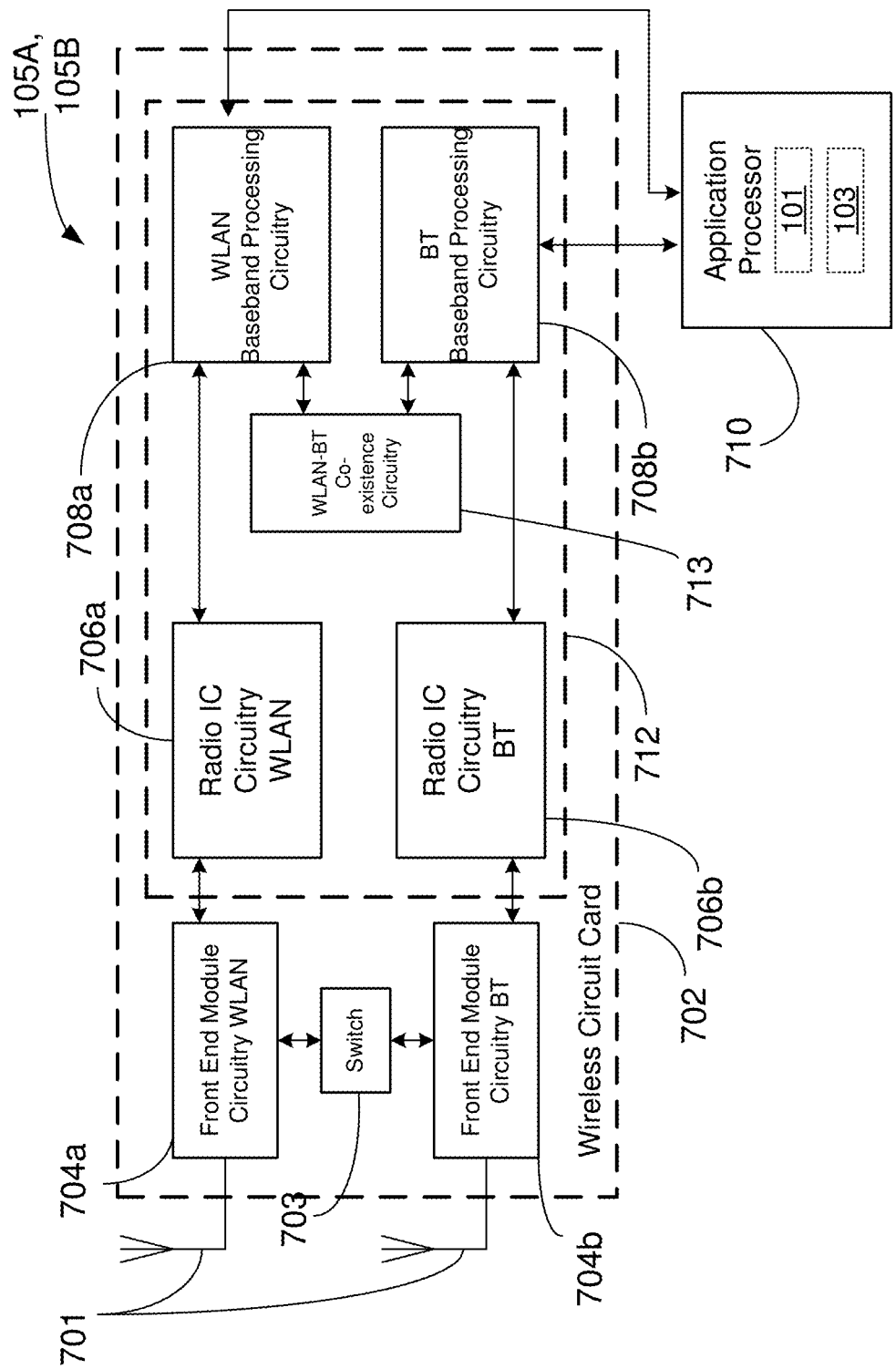
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708*a-b* may include a WLAN baseband processing circuitry 708*a* and a BT baseband processing circuitry 708*b*. The WLAN baseband processing circuitry 708*a* may include a memory, such as, for example, a set of RAM arrays in a Fast Fourier Transform or Inverse Fast Fourier Transform block (not shown) of the WLAN baseband processing circuitry 708*a*. Each of the WLAN baseband circuitry 708*a* and the BT baseband circuitry 708*b* may further include one or more processors and control logic to process the signals received from the corresponding WLAN or BT receive signal path of the radio IC circuitry 706*a-b*, and to also generate corresponding WLAN or BT baseband signals for the transmit signal path of the radio IC circuitry 706*a-b*. Each of the baseband processing circuitries 708*a* and 708*b* may further include physical layer (PHY) and medium access control layer (MAC) circuitry, and may further interface with a device for generation and processing of the baseband signals and for controlling operations of the radio IC circuitry 706*a-b*.

Referring still to FIG. 7, according to the shown embodiment, WLAN-BT coexistence circuitry 713 may include logic providing an interface between the WLAN baseband circuitry 708*a* and the BT baseband circuitry 708*b* to enable use cases requiring WLAN and BT coexistence. In addition, a switch 703 may be provided between the WLAN FEM circuitry 704*a* and the BT FEM circuitry 704*b* to allow switching between the WLAN and BT radios according to application needs. In addition, although the antennas 701 are depicted as being respectively connected to the WLAN FEM circuitry 704*a* and the BT FEM circuitry 704*b*, embodiments include within their scope the sharing of one or more antennas as between the WLAN and BT FEMs, or the provision of more than one antenna connected to each of FEM 704*a* or 704*b*.

In some embodiments, the front-end module circuitry 704*a-b*, the radio IC circuitry 706*a-b*, and baseband processing circuitry 708*a-b* may be provided on a single radio card, such as wireless radio card 702. In some other embodiments, the one or more antennas 701, the FEM circuitry 704*a-b* and the radio IC circuitry 706*a-b* may be provided on a single radio card. In some other embodiments, the radio IC circuitry 706*a-b* and the baseband processing circuitry 708*a-b* may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
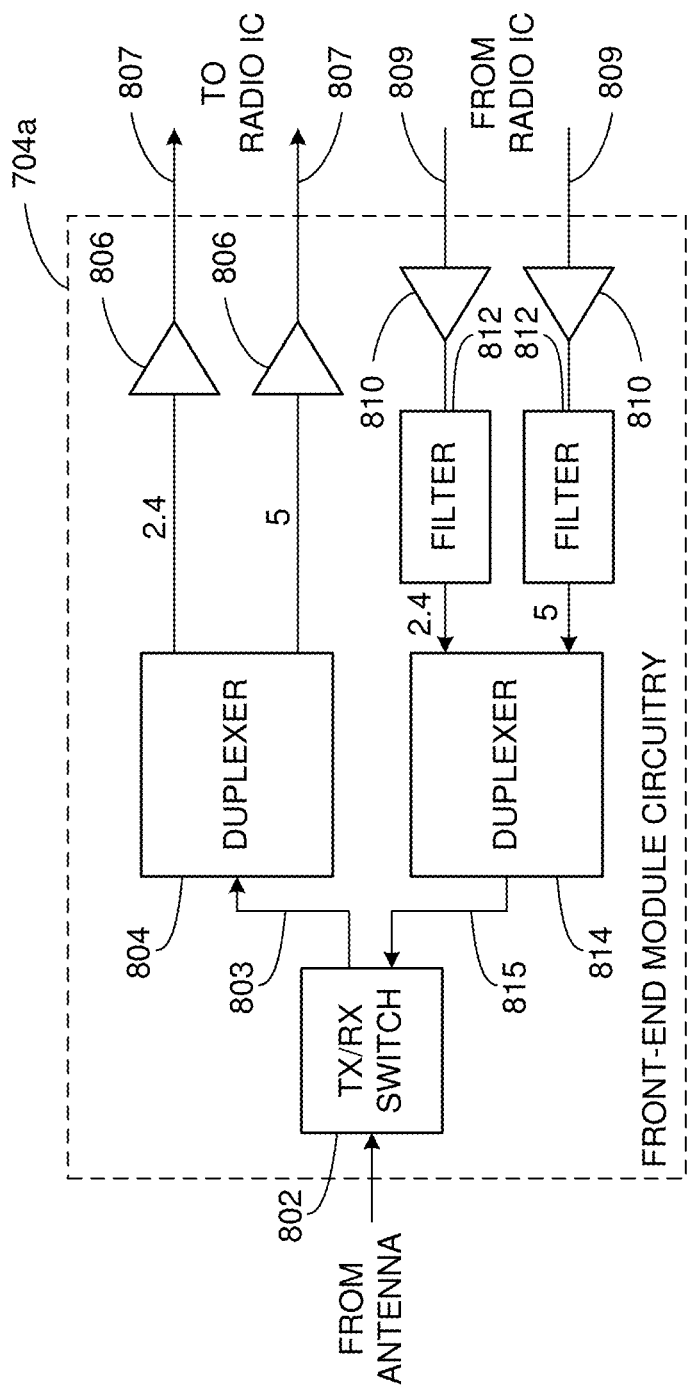
FIG. 8 illustrates an example front-end module circuitry for use in the radio architecture of FIG. 7, in accordance with one or more example embodiments of the present disclosure.

FIG. 8 illustrates WLAN FEM circuitry 704*a* in accordance with some embodiments. Although the example of FIG. 8 is described in conjunction with the WLAN FEM circuitry 704*a*, the example of FIG. 8 may be described in conjunction with the example BT FEM circuitry 704*b* (FIG. 7), although other circuitry configurations may also be suitable.

In some embodiments, the FEM circuitry 704*a* may include a TX/RX switch 802 to switch between transmit mode and receive mode operation. The FEM circuitry 704*a* may include a receive signal path and a transmit signal path. The receive signal path of the FEM circuitry 704*a* may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
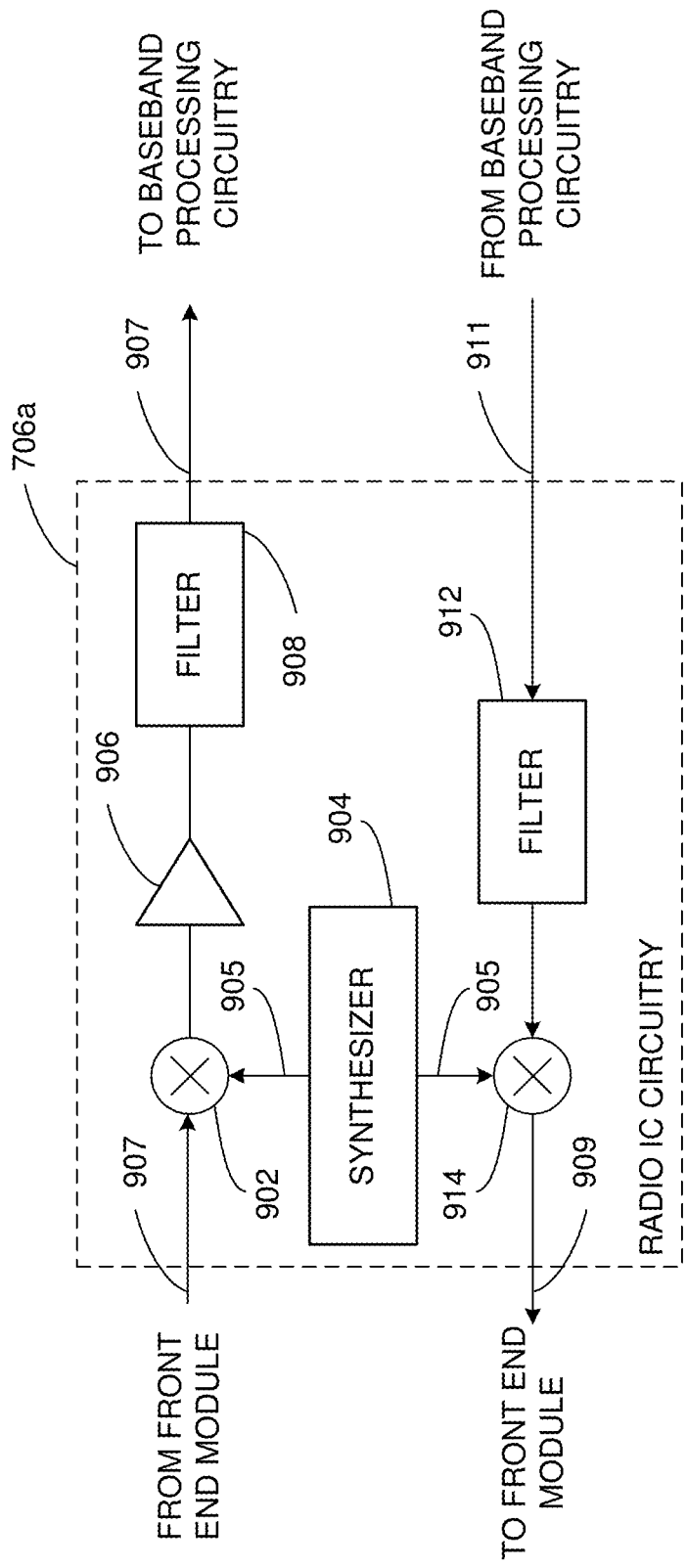
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
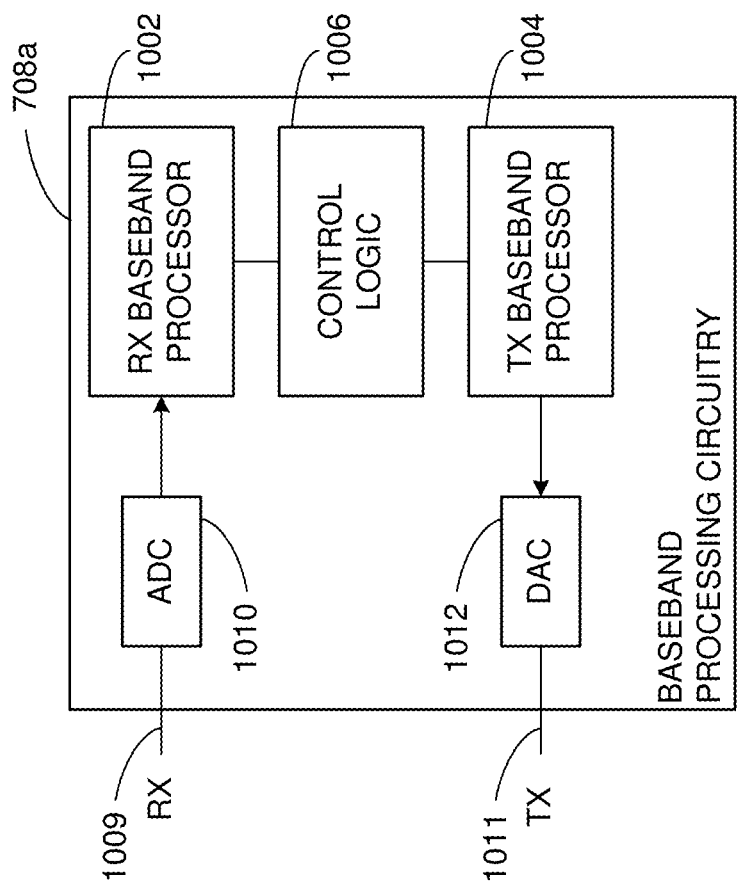
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish a communication session with one or more next generation vehicle (NGV) device; determine an NGV frame comprising a legacy signal field (L-SIG) and an NGV signal field; determine a plurality of data subcarriers and a plurality of pilot subcarriers associated with the L-SIG, wherein the plurality of data subcarriers and the plurality of pilot subcarriers are surrounded by at least two additional subcarriers associated with the L-SIG; and cause to send the NGV frame to the one or more NGV device.

Example 2 may include the device of example 1 and/or some other example herein, wherein the at least two additional subcarriers associated with the L-SIG are located at band edges of the L-SIG.

Example 3 may include the device of example 2 and/or some other example herein, wherein the at least two additional subcarriers associated with the L-SIG are used as training bits.

Example 4 may include the device of example 1 and/or some other example herein, wherein the NGV frame comprises a legacy long training field (L-LTF) and a legacy short training field (L-STF).

Example 5 may include the device of example 4 and/or some other example herein, wherein the L-LTF comprises at least two additional subcarriers located at band edges of the L-LTF used as training bits.

Example 6 may include the device of example 1 and/or some other example herein, wherein the NGV frame may be backward-compatible with 802.11p legacy devices.

Example 7 may include the device of example 1 and/or some other example herein, wherein the at least two additional subcarriers associated with the L-SIG are used as additional signaling bits.

Example 8 may include the device of example 1 and/or some other example herein, wherein 802.11p legacy devices ignore the at least two additional subcarriers of the L-SIG.

Example 9 may include the device of example 1 and/or some other example herein, wherein NGV devices detect and decode the NGV frame based on the at least two additional subcarriers associated with the L-SIG.

Example 10 may include a non-transitory computer-readable medium storing computer-executable instructions which when executed by one or more processors result in performing operations comprising: establishing a communication session with one or more next generation vehicle (NGV) device; determining an NGV frame comprising a legacy signal field (L-SIG) and an NGV signal field; determining a plurality of data subcarriers and a plurality of pilot subcarriers associated with the L-SIG, wherein the plurality of data subcarriers and the plurality of pilot subcarriers are surrounded by at least two additional subcarriers associated with the L-SIG; and causing to send the NGV frame to the one or more NGV device.

Example 11 may include the non-transitory computer-readable medium of example 10 and/or some other example herein, wherein the at least two additional subcarriers associated with the L-SIG are located at band edges of the L-SIG.

Example 12 may include the non-transitory computer-readable medium of example 11 and/or some other example herein, wherein the at least two additional subcarriers associated with the L-SIG are used as training bits.

Example 13 may include the non-transitory computer-readable medium of example 10 and/or some other example herein, wherein the NGV frame comprises a legacy long training field (L-LTF) and a legacy short training field (L-STF).

Example 14 may include the non-transitory computer-readable medium of example 13 and/or some other example herein, wherein the L-LTF comprises at least two additional subcarriers located at band edges of the L-LTF used as training bits.

Example 15 may include the non-transitory computer-readable medium of example 10 and/or some other example herein, wherein the NGV frame may be backward-compatible with 802.11p legacy devices.

Example 16 may include the non-transitory computer-readable medium of example 10 and/or some other example herein, wherein the at least two additional subcarriers associated with the L-SIG are used as additional signaling bits.

Example 17 may include the non-transitory computer-readable medium of example 10 and/or some other example herein, wherein 802.11p legacy devices ignore the at least two additional subcarriers of the L-SIG.

Example 18 may include the non-transitory computer-readable medium of example 10 and/or some other example herein, wherein NGV devices detect and decode the NGV frame based on the at least two additional subcarriers associated with the L-SIG.

Example 19 may include a method comprising: establishing, by one or more processors, a communication session with one or more next generation vehicle (NGV) device; determining an NGV frame comprising a legacy signal field (L-SIG) and an NGV signal field; determining a plurality of data subcarriers and a plurality of pilot subcarriers associated with the L-SIG, wherein the plurality of data subcarriers and the plurality of pilot subcarriers are surrounded by at least two additional subcarriers associated with the L-SIG; and causing to send the NGV frame to the one or more NGV device.

Example 20 may include the method of example 19 and/or some other example herein, wherein the at least two additional subcarriers associated with the L-SIG are located at band edges of the L-SIG.

Example 21 may include the method of example 20 and/or some other example herein, wherein the at least two additional subcarriers associated with the L-SIG are used as training bits.

Example 22 may include the method of example 19 and/or some other example herein, wherein the NGV frame comprises a legacy long training field (L-LTF) and a legacy short training field (L-STF).

Example 23 may include the method of example 22 and/or some other example herein, wherein the L-LTF comprises at least two additional subcarriers located at band edges of the L-LTF used as training bits.

Example 24 may include the method of example 19 and/or some other example herein, wherein the NGV frame may be backward-compatible with 802.11p legacy devices.

Example 25 may include the method of example 19 and/or some other example herein, wherein the at least two additional subcarriers associated with the L-SIG are used as additional signaling bits.

Example 26 may include the method of example 19 and/or some other example herein, wherein 802.11p legacy devices ignore the at least two additional subcarriers of the L-SIG.

Example 27 may include the method of example 19 and/or some other example herein, wherein NGV devices detect and decode the NGV frame based on the at least two additional subcarriers associated with the L-SIG.

Example 28 may include an apparatus comprising means for: establishing a communication session with one or more next generation vehicle (NGV) device; determining an NGV frame comprising a legacy signal field (L-SIG) and an NGV signal field; determining a plurality of data subcarriers and a plurality of pilot subcarriers associated with the L-SIG, wherein the plurality of data subcarriers and the plurality of pilot subcarriers are surrounded by at least two additional subcarriers associated with the L-SIG; and causing to send the NGV frame to the one or more NGV device.

Example 29 may include the apparatus of example 28 and/or some other example herein, wherein the at least two additional subcarriers associated with the L-SIG are located at band edges of the L-SIG.

Example 30 may include the apparatus of example 29 and/or some other example herein, wherein the at least two additional subcarriers associated with the L-SIG are used as training bits.

Example 31 may include the apparatus of example 19 and/or some other example herein, wherein the NGV frame comprises a legacy long training field (L-LTF) and a legacy short training field (L-STF).

Example 32 may include the apparatus of example 31 and/or some other example herein, wherein the L-LTF comprises at least two additional subcarriers located at band edges of the L-LTF used as training bits.

Example 33 may include the apparatus of example 19 and/or some other example herein, wherein the NGV frame may be backward-compatible with 802.11p legacy devices.

Example 34 may include the apparatus of example 19 and/or some other example herein, wherein the at least two additional subcarriers associated with the L-SIG are used as additional signaling bits.

Example 35 may include the apparatus of example 19 and/or some other example herein, wherein 802.11p legacy devices ignore the at least two additional subcarriers of the L-SIG.

Example 36 may include the apparatus of example 19 and/or some other example herein, wherein NGV devices detect and decode the NGV frame based on the at least two additional subcarriers associated with the L-SIG.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   establish a communication session with one or more next generation vehicle (NGV) device;
   determine an NGV frame comprising a legacy signal field (L-SIG) and an NGV signal field;
   determine a plurality of data subcarriers and a plurality of pilot subcarriers associated with the L-SIG, wherein the plurality of data subcarriers and the plurality of pilot subcarriers are surrounded by at least two additional subcarriers associated with the L-SIG to notify other NGV devices of the presence of 802.11p devices in a surrounding area; and
   cause to send the NGV frame to the one or more NGV devices.

2. The device of claim 1, wherein the at least two additional subcarriers associated with the L-SIG are located at band edges of the L-SIG.

3. The device of claim 2, wherein the at least two additional subcarriers associated with the L-SIG are used as training bits.

4. The device of claim 1, wherein the NGV frame comprises a legacy long training field (L-LTF) and a legacy short training field (L-STF).

5. The device of claim 4, wherein the L-LTF comprises at least two additional subcarriers located at band edges of the L-LTF used as training bits.

6. The device of claim 1, wherein the NGV frame is backward-compatible with 802.11p legacy devices.

7. The device of claim 1, wherein the at least two additional subcarriers associated with the L-SIG are used as additional signaling bits.

8. The device of claim 1, wherein 802.11p legacy devices ignore the at least two additional subcarriers of the L-SIG.

9. The device of claim 1, wherein NGV devices detect and decode the NGV frame based on the at least two additional subcarriers associated with the L-SIG.

10. A non-transitory computer-readable medium storing computer-executable instructions which when executed by one or more processors result in performing operations comprising:
    establishing a communication session with one or more next generation vehicle (NGV) device;
    determining an NGV frame comprising a legacy signal field (L-SIG) and an NGV signal field;
    determining a plurality of data subcarriers and a plurality of pilot subcarriers associated with the L-SIG, wherein the plurality of data subcarriers and the plurality of pilot subcarriers are surrounded by at least two additional subcarriers associated with the L-SIG to notify other NGV devices of the presence of 802.11p devices in a surrounding area; and
    causing to send the NGV frame to the one or more NGV devices.

11. The non-transitory computer-readable medium of claim 10, wherein the at least two additional subcarriers associated with the L-SIG are located at band edges of the L-SIG.

12. The non-transitory computer-readable medium of claim 11, wherein the at least two additional subcarriers associated with the L-SIG are used as training bits.

13. The non-transitory computer-readable medium of claim 10, wherein the NGV frame comprises a legacy long training field (L-LTF) and a legacy short training field (L-STF).

14. The non-transitory computer-readable medium of claim 13, wherein the L-LTF comprises at least two additional subcarriers located at band edges of the L-LTF used as training bits.

15. The non-transitory computer-readable medium of claim 10, wherein the NGV frame is backward-compatible with 802.11p legacy devices.

16. The non-transitory computer-readable medium of claim 10, wherein the at least two additional subcarriers associated with the L-SIG are used as additional signaling bits.

17. The non-transitory computer-readable medium of claim 10, wherein 802.11p legacy devices ignore the at least two additional subcarriers of the L-SIG.

18. The non-transitory computer-readable medium of claim 10, wherein NGV devices detect and decode the NGV frame based on the at least two additional subcarriers associated with the L-SIG.

19. A method comprising:
    establishing, by one or more processors, a communication session with one or more next generation vehicle (NGV) device;
    determining an NGV frame comprising a legacy signal field (L-SIG) and an NGV signal field;
    determining a plurality of data subcarriers and a plurality of pilot subcarriers associated with the L-SIG, wherein the plurality of data subcarriers and the plurality of pilot subcarriers are surrounded by at least two additional subcarriers associated with the L-SIG to notify other NGV devices of the presence of 802.11p devices in a surrounding area; and
    causing to send the NGV frame to the one or more NGV devices.

20. The method of claim 19, wherein the at least two additional subcarriers associated with the L-SIG are located at band edges of the L-SIG.

* * * * *